(12) United States Patent
Cho et al.

(10) Patent No.: US 7,146,025 B2
(45) Date of Patent: Dec. 5, 2006

(54) APPARATUS AND METHOD FOR PROVIDING SECURITY IN A BASE OR MOBILE STATION BY USING DETECTION OF FACE INFORMATION

(75) Inventors: In-myung Cho, Kyungki-do (KR); Tae-kyun Kim, Kyungki-do (JP)

(73) Assignee: Samsung Electronics Co., Ltd., Suwon (KR)

( * ) Notice: Subject to any disclaimer, the term of this patent is extended or adjusted under 35 U.S.C. 154(b) by 590 days.

(21) Appl. No.: 10/353,931

(22) Filed: Jan. 30, 2003

(65) Prior Publication Data

US 2003/0142854 A1 Jul. 31, 2003

(30) Foreign Application Priority Data

Jan. 30, 2002 (KR) ................... 2002-5368

(51) Int. Cl.
*G06K 9/00* (2006.01)
*G05B 19/00* (2006.01)
*H04K 1/00* (2006.01)

(52) U.S. Cl. .................... 382/115; 340/5.83; 713/186

(58) Field of Classification Search ............. 340/5.2, 340/5.53–5.83; 726/3–9; 713/186; 455/411, 455/404.2, 456.1
See application file for complete search history.

(56) References Cited

U.S. PATENT DOCUMENTS

| | | | |
|---|---|---|---|
| 6,212,636 B1 * | 4/2001 | Boyle et al. | 713/168 |
| 6,453,159 B1 * | 9/2002 | Lewis | 455/411 |
| 6,724,919 B1 * | 4/2004 | Akiyama et al. | 382/118 |
| 2001/0034223 A1 * | 10/2001 | Rieser et al. | 455/404 |

* cited by examiner

*Primary Examiner*—Joseph Mancuso
*Assistant Examiner*—Hadi Akhavannik
(74) *Attorney, Agent, or Firm*—Buchanan Ingersoll & Rooney PC

(57) ABSTRACT

Provided are an apparatus and method for providing security for an image signal in a base station or a terminal by detecting face information from the image signal. The apparatus includes a signal receiving unit receiving an image signal transmitted from a terminal, a location discriminating unit detecting a calling location of the terminal and checking if the calling location falls within a security region, and a controller transmitting the image signal when the calling location does not fall within the security region, or when the calling location falls within the security region and the image signal contains face information. Accordingly, it is possible to prevent unauthorized transmission of images without additional big burden of security equipment or an invasion of individual rights of using image communication.

13 Claims, 5 Drawing Sheets

(a) ORIGINAL IMAGE (b) EDITING OF BACKGROUND (c) EDITING OF FIGURE

APPARATUS AND METHOD FOR PROVIDING SECURITY IN A BASE OR MOBILE STATION BY USING DETECTION OF FACE INFORMATION

BACKGROUND OF THE INVENTION

This application claims the priority of Korean Patent Application No. 2002-5368, filed Jan. 30, 2002 in the Korean Intellectual Property Office, which is incorporated herein in its entirety by reference.

FIELD OF THE INVENTION

The present invention relates to an apparatus and method for providing security in a base station or a terminal by detecting face information.

DESCRIPTION OF THE RELATED ART

Nowadays, the use of personal image terminals spreads quickly and communication service providers have provided users with a variety of location-based services. Also, an improvement in the performance of a computer, a display, and a battery results in an improvement in the resolution of an image displayed on a terminal. Extensive use of mobile phones capable of displaying images, however, causes a lot of problems such as information leakage unlike in general voice-only mobile phones. For instance, image information may be transmitted to another party regardless of a user's desires, or security information may leak. Further, a user of an image mobile phone may request the inclusion of various functions for editing an image on the phone display.

For security reasons, transmitting and receiving of an electric wave output from an image mobile phone is conventionally filtered using an electric-wave filtering device. This method is, however, difficult to be generalized since the jamming equipment is expensive. Meanwhile, to prevent transmission of image information a user does not want to reveal, it is suggested that a predetermined image be transmitted instead of a real image. However, this method does not satisfy a user's desire of variously editing an image. Accordingly, there is a need for a method of selectively filtering the transmission of an image when leakage of information is strictly restricted within a limited area, while allowing personal image communication, thereby protecting individual privacy and maintaining information security.

SUMMARY OF THE INVENTION

To solve the above and other problems, it is the first object of the present invention to provide an apparatus and method for providing security in a base station, in which it is determined to transmit an image signal from a terminal based on whether a facial image is included in the current image signal.

It is the second object of the present invention to provide an apparatus and method for providing security in a terminal, in which it is determined to transmit an image signal created in the terminal based on whether a facial image is included in the current image signal.

To achieve the above and other objects, there is provided an apparatus for providing security for an image signal in a base station, the apparatus including a signal receiving unit that receives an image signal transmitted from a terminal; a location discriminating unit that detects a calling location of the terminal and checking if the calling location falls within a security region; and a controller that transmits the image signal when the calling location does not fall within the security region, or when the calling location falls within the security region and the image signal contains face information.

To achieve the above and other objects, there is provided a method for providing security of an image signal in a base station, the method including receiving an image signal transmitted from a terminal and checking if the image signal contains face information; detecting a calling location of the terminal and checking if the calling location falls within a security region; and transmitting the image signal when the calling location does not fall within the security region, or when the calling location falls within the security region and the image signal contains face information.

To achieve the above and other objects, there is provided an apparatus for providing an image signal in a terminal, the apparatus including an image creating unit creating an image signal; a face information detecting unit detecting face information from the image signal; a face information verifying unit discriminating if the face information corresponds to the face of a user when the face information is detected from the image signal; and a signal transmitting unit transmitting the image signal containing the face information when the face information is determined to be related to the user's face.

To achieve the above and other objects, there is provided a method for providing an image signal in a terminal, the method including creating an image signal and detecting face information from the image signal; checking whether the face information corresponds to the face of a user when the face information is detected from the image signal; and transmitting the image signal containing the face information if the face information corresponds to the user's face.

BRIEF DESCRIPTION OF THE DRAWINGS

The above and other objects and advantages of the present invention will become more apparent by describing in detail preferred embodiments thereof with reference to the attached drawings in which.

DETAILED DESCRIPTION OF THE INVENTION

Figure 1:
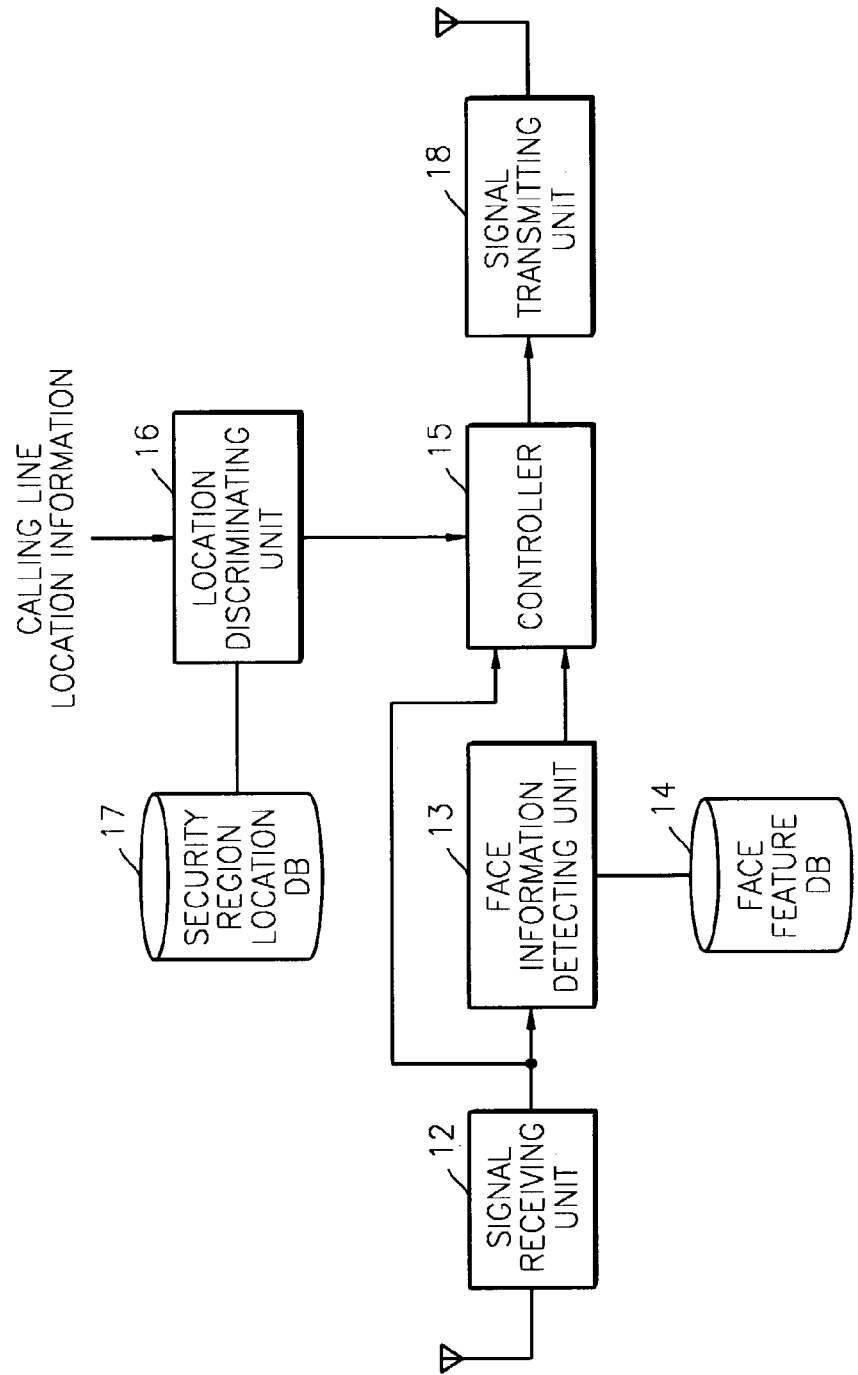
FIG. 1 is a block diagram of a signal security apparatus used in a base station according to a preferred embodiment of the present invention.
Figure 2:
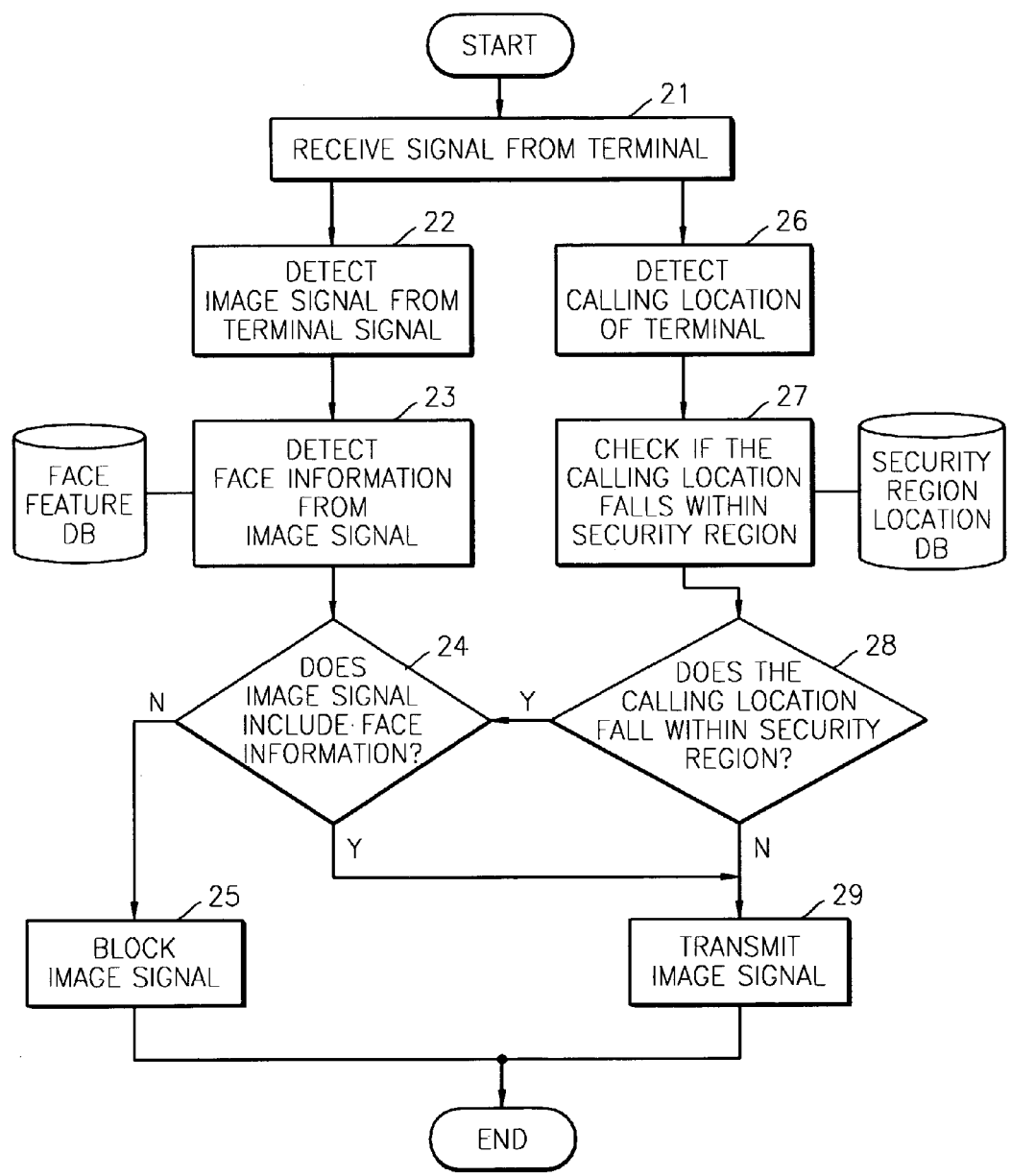
FIG. 2 is a flowchart illustrating a method for providing security using the signal security apparatus of FIG. 1.

FIG. 1 is a block diagram of a signal security device used in a base station, which provides security for a signal transmitted from a terminal, according to a preferred embodiment of the present invention. FIG. 2 is a flow chart illustrating a method for providing security using the signal security device shown in FIG. 1.

Referring to FIGS. 1 and 2, a signal receiving unit 12 receives a signal transmitted from a terminal (not shown) via an antenna in operation 21. Here, the terminal refers to an apparatus for transmitting a signal including voice information or data information together with an image signal. A face information detecting unit 13 detects the image signal from the terminal signal in operation 22 and checks if the image signal contains any face information in operation 23. A face feature database 14 stores data regarding the features of face patterns used to classify a image pattern as a face or not and is used to detect face information out of the image signal. The face feature database 14 holds data regarding the features of face patterns and data regarding the features of objects, other than the face patterns, which are obtained through learning.

The face information detecting unit 13 extracts a feature vector from brightness information of the image signal so that face pattern information is preserved in dimension reduction of the data when there exist variations of environmental conditions. Methods to extract features of an object in order to recognize the pattern of the object include a principle component analysis (PCA) method, an independent component analysis (ICA) method, and a wavelet method. Whether a face pattern is included in an image signal is determined by using a feature vector extracted from the image signal and the stored feature data obtained through learning in advance. If there is a face pattern in the image signal, information regarding the detected face pattern, e.g., the location and size thereof, is also detected. A linear classifier, or a non-linear classifier such as a neural net and a support vector machine (SVM) can be applied to face/non-face pattern classification in the face information detecting unit 13.

Meanwhile, location information regarding regions requiring security is registered from a user in advance and stored in security region location database 17 (hereinafter, 'DB 17'). A location discriminating unit 16 detects information on the calling location of a terminal in operation 26 and then compares this information with the location information stored in the DB 17 to check if the calling location of the terminal belongs to the security regions in operation 27. The calling location of a terminal can be detected by analyzing a signal output from the terminal, or information regarding a repeater or a base station. Otherwise, for detecting the calling location of a terminal, additional equipment is established in a security region such that the face that a signal from the terminal is transmitted within the security region is informed to a base station, or an additional signal is added to the signal output from the terminal and the result is transmitted.

A controller 15 receives an image signal from the signal receiving unit 12 and transmits the image signal without changing it when the calling location of the terminal does not belong to the security region, in operation 28. However, if it is determined in operation 28 that the calling location of the terminal belongs to the security region, it is checked in operation 24 if face information is included in the image signal. If the result of operation 24 reveals that the image signal contains face information, the image signal is transmitted in operation 29. If not so, the image signal is blocked in operation 25. In other words, unless the calling location of the terminal falls within the security region, the image signal is transmitted regardless of whether face information is included in the image signal. However, if the calling location of the terminal falls within the security region, the image signal is transmitted when the image signal contains the face information but the image signal is blocked in the reverse case. Meanwhile, when transmitting the image signal, it is possible to extract the face information including the position and boundaries of the face from the image signal and transmit the extracted face information excluding a background image.

Figure 3:
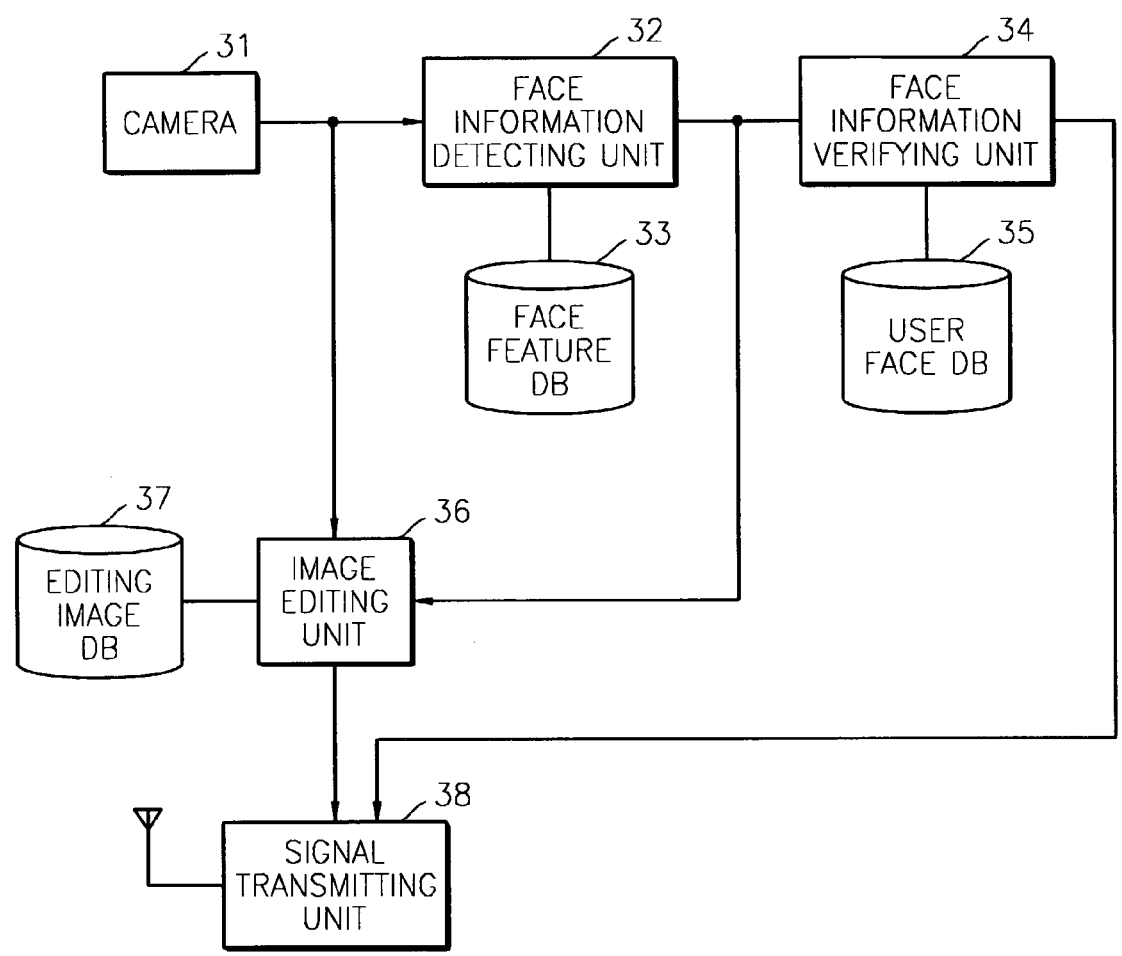
FIG. 3 is a block diagram of an apparatus for providing security in a terminal.
Figure 4:
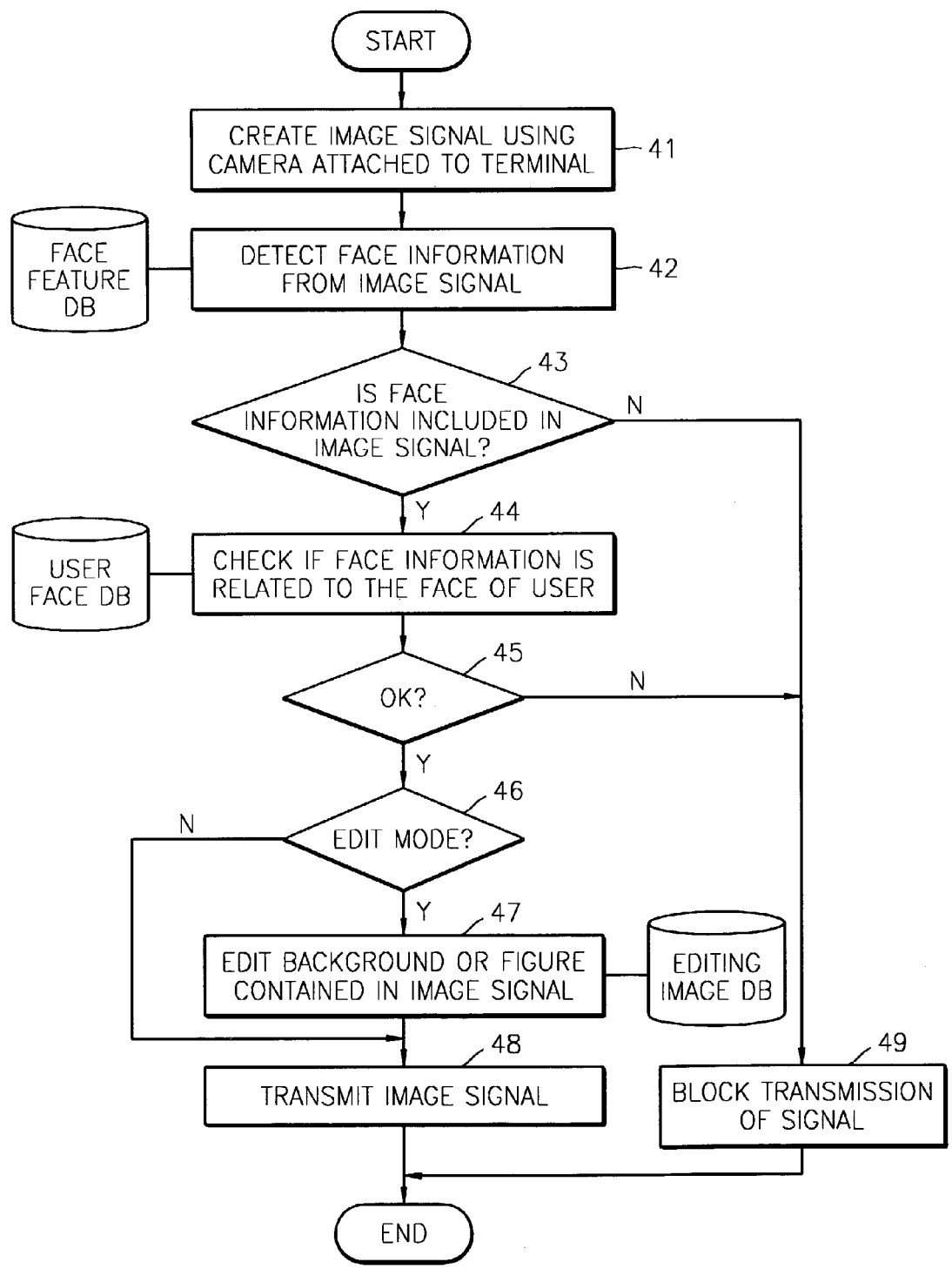
FIG. 4 is a flowchart illustrating a method for providing security using the apparatus of FIG. 3.

FIG. 3 is a block diagram of an apparatus for providing security for image information in a terminal that allows image communication, according to a preferred embodiment of the present invention. FIG. 4 is a flow chart illustrating a method for providing security using the apparatus of FIG. 3. Here, the terminal includes all kinds of communication apparatuses that allow transmission of an image, e.g., mobile phones, wire phones, and personal computers (PCs) and communication apparatuses that allow Internet communication.

Referring to FIGS. 3 and 4, a camera 31 attached to an image terminal receives image information and creates an image signal thereof in operation 41. A face information detecting unit 32 detects a face information from the image signal in operation 42. A face feature DB 33 holds data regarding features of face patterns and is used to detect face information from the image signal. That is, the face feature DB 33 holds data regarding features of face patterns and other patterns that are obtained through learning.

A face information detecting unit 32 extracts a feature vector related to face patterns from brightness information of the image signal. Features of a pattern can be extracted using a PCA method, ICA method, or a wavelet method as described above. It is possible to check whether a face pattern is included in the image signal using the various types of classification functions such as a linear classifier and Support Vector Machines. Also, there is a classification function that is based on comparison of the feature vector extracted from the received image signal and feature data that is previously obtained through learning.

A face information verifying unit 34 discriminates if face information is related to the face of a user in operation 44 when face information is detected from the image signal in operation 43. A user face pattern DB 35 (hereinafter, 'DB 35') holds pattern information regarding the face of the user. The face information verifying unit 34 compares the face information detected by the face information detecting unit 32 with the pattern information stored in the DB 35.

A signal transmitting unit 38 transmits the image signal containing the face information in case that the face information detected from the image signal is the same as the user's face, in operation 48. The signal transmitting unit 38 can block the image signal in operation 49 or stop the operation of the terminal when the face information is not detected from the image signal or is not the same as the user's face.

A method of determining transmission of an image signal in a terminal, depending on whether or not face information detected from the image signal is related to a user's face, can be applied to the method for providing security in a base station, described with reference to FIGS. 1 and 2. For instance, it is assumed that a base station may hold information regarding the faces of users of terminals to correspond to the phone numbers of the terminals. The base station detects the face information of a user from the received image signal and check if the detected face information corresponds to the face of the user, when the user of a certain terminal requests the base station to provide him or her with image communication. If the face information is not related to the user's face, the base station can interfere with the transmission of an image signal regardless of whether calling location of the terminal falls within a security region.

An image editing unit 36 edits a background or a figure contained in an image signal in operation 47 after a user has decided to edit an original image in operation 46. Editing image DB 37 holds a variety of image information regarding background or figures. An image editing unit 36 is given an image signal generated by the camera 31 or face information detected by the face information detecting unit 32 and detects information, e.g., location and size, regarding the face information in the image signal.

In a mode of editing a background, the image signal is edited by extracting a figure image related to the face information from the image signal, selecting a background image from the editing image DB 37, and overlapping the figure image on the selected background image. In a mode of editing a figure, the image signal is edited by selecting a desired facial image from the editing image DB 37 and replacing the face information contained in the image signal with the selected facial image. If the image signal is edited in an editing mode, the signal transmitting unit 38 transmits the edited image signal instead of the original image signal.

Figure 5:
FIG. 5 illustrates an original image and images whose background or a figure is edited from the original image according to an editing mode.
Figure 5:
Figure 5:

FIG. 5 illustrates an original image, and an image in which the background or figure of the original image is edited according to an edit mode. In detail, (a) denotes an original image, (b) denotes an image in which the background of the original image is replaced with another background image, and (c) denotes an image in which the figure of the original image is replaced with another figure image. Background images or figure images used in editing of an image are stored in a database in advance and can be arbitrarily selected by a user.

A terminal according to the present invention may include an additional key for setting the aforementioned security function into the terminal. Inclusion of the security function into the terminal allows the terminal to operate as described above, but also allows the terminal to perform general communication in the reverse case.

The present invention can be embodied as a computer readable code in a computer readable medium. Here, the computer readable medium may be any recording apparatus capable of storing data that can be read by a computer system, e.g., a read-only memory (ROM), a random access memory (RAM), a compact disc (CD)-ROM, a magnetic tape, a floppy disk, an optical data storage device, and so on. Also, the computer readable medium may be a carrier wave that transmits data via the Internet, for example. The computer readable recording medium can be remotely installed in a computer system connected to a network, and stored and executed as a computer readable code by a distributed computing environment.

While this invention has been particularly shown and described with reference to preferred embodiments thereof, it will be understood by those skilled in the art that various changes in form and details may be made therein without departing from the spirit and scope of the invention as defined by the appended claims.

As described above, in an apparatus and method for providing security according to the present invention, transmission of an image signal from a terminal is determined based on certain information contained in the image signal. Thus, it is possible to prevent unauthorized transmission of images without additional big burden of security equipment or an invasion of individual rights of using image communication In detail, an apparatus and method for providing security in a base station determine whether to transmit an image signal transmitted from a terminal by checking inclusion of face information into the image signal, thereby preventing transmission of a background image of calling location of the terminal without any limitation. An apparatus and method for providing security in a terminal transmit an image signal input from a camera attached to the terminal if the image signal contains face information of a true user, and block the image signal or signal transmission itself in the terminal in the reverse case, thereby preventing unauthorized use of the terminal.

What is claimed is:

1. An apparatus for providing security for an image signal in a base station, the apparatus comprising: a signal receiving unit receiving an image signal transmitted from an image capturing terminal; a location discriminating unit detecting a calling location of the terminal and checking if the calling location falls within a security region; and a controller transmitting the image signal 1) when the calling location does not fall within the security region, and 2) when the calling location falls within the security region and the image signal contains face information.

2. The apparatus of claim 1, wherein when the controller transmits image information, only the face information, excluding a background image, is extracted from the image information and transmitted.

3. The apparatus of claim 1 further comprising a database for storing location information regarding at least one security region.

4. The apparatus of claim 1, wherein when the image signal includes face information, the controller checks if the face information extracted from the image signal is related to the face of a user and transmits the image signal if the face information refers to the face of the user.

5. A method for providing security of an image signal in a base station, the method comprising: (a) receiving an image signal transmitted from an image capturing terminal and checking if the image signal contains face information; (b) detecting a calling location of the terminal and checking if the calling location falls within a security region; and (c) transmitting the image signal 1) when the calling location does not fall within the security region, and 2) when the calling location falls within the security region and the image signal contains face information.

6. The method of claim 5, wherein when the image signal is transmitted in (c), only face information, excluding a background image, is extracted from the image signal and transmitted.

7. The method of claim 5, wherein when the image signal contains the face information in (c), it is checked if the face information extracted from the image signal is related to the face of a user and the image signal is transmitted when the face information is related to the user's face.

8. A computer-readable recording medium recording and storing a computer program to execute a method comprising: (a) receiving an image signal transmitted from a terminal and checking if the image signal contains face information; (b) detecting a calling location of the terminal and checking if the calling location falls within a security region; and (c) transmitting the image signal 1) when the calling location does not fall within the security region, and 2) when the calling location falls within the security region and the image signal contains the face information.

9. The apparatus of claim 1, wherein the image capturing terminal is a mobile communication device.

10. An apparatus comprising:
a signal receiving unit receiving an image signal transmitted from an image capturing terminal, a location discriminating unit detecting the physical location of the image capturing terminal and checking to determine whether the physical location falls within the security region; and a controller transmitting the image signal 1) when the physical location is not within the security region, and 2) when the physical location falls within the security region and the image signal contains face information.

11. The apparatus of claim 10 wherein the image capturing terminal is selected from a group consisting of mobile phones, land line phones, personal computers and communication apparatuses that allow public network communication.

12. The apparatus of claim 10 further comprising a database for storing physical location information with respect to at least one security region.

13. The apparatus of claim 10 wherein when the image signal includes face information, the controller checks to determine whether the face information extracted from the image signal is related to the face of a user and transmits the image signal if the face information corresponds to the face of the user.

* * * * *